United States Patent
Matsuoka et al.

(10) Patent No.: US 7,972,669 B2
(45) Date of Patent: *Jul. 5, 2011

(54) BIODEGRADABLE RESIN FOAM SHEET, BIODEGRADABLE RESIN FOAM ARTICLE AND BIODEGRADABLE RESIN MOLDED CONTAINER

(75) Inventors: Fumio Matsuoka, Uji (JP); Kazue Ueda, Uji (JP); Tatsuya Matsumoto, Uji (JP); Yutaka Oogi, Uji (JP)

(73) Assignee: Unitika Ltd., Hyogo (JP)

(*) Notice: Subject to any disclaimer, the term of this patent is extended or adjusted under 35 U.S.C. 154(b) by 130 days.

This patent is subject to a terminal disclaimer.

(21) Appl. No.: 12/084,334

(22) PCT Filed: Oct. 27, 2006

(86) PCT No.: PCT/JP2006/321469
§ 371 (c)(1),
(2), (4) Date: Apr. 28, 2008

(87) PCT Pub. No.: WO2007/052543
PCT Pub. Date: May 10, 2007

(65) Prior Publication Data
US 2009/0258175 A1 Oct. 15, 2009

(30) Foreign Application Priority Data

Nov. 4, 2005 (JP) .................................. 2005-320899

(51) Int. Cl.
*B65D 39/00* (2006.01)
(52) U.S. Cl. ...................... 428/36.5; 428/304.4; 521/182
(58) Field of Classification Search ............... 428/304.4, 428/36.5; 521/142, 182
See application file for complete search history.

(56) References Cited

U.S. PATENT DOCUMENTS

| 5,447,962 | A | 9/1995 | Ajioka et al. |
| 5,591,491 | A * | 1/1997 | Ando et al. .................... 427/544 |
| 7,825,179 | B2 * | 11/2010 | Kawahara et al. ............ 524/322 |
| 2002/0136848 | A1 * | 9/2002 | Yoshii et al. ................. 428/35.7 |
| 2005/0027098 | A1 * | 2/2005 | Hayes ........................... 528/272 |
| 2005/0163944 | A1 | 7/2005 | Isshiki et al. |
| 2006/0091576 | A1 * | 5/2006 | Takase et al. ................... 264/51 |
| 2008/0249227 | A1 | 10/2008 | Ueda et al. |
| 2008/0262150 | A1 | 10/2008 | Takenaka et al. |
| 2009/0258982 | A1 | 10/2009 | Kawahara et al. |

FOREIGN PATENT DOCUMENTS

| JP | 05-179110 | 7/1993 |
| JP | 11-106628 | 4/1999 |
| JP | 2002-302560 | 10/2002 |
| JP | 2003-055569 | 2/2003 |
| JP | 2003-268223 | 9/2003 |
| JP | 2004-059608 | 2/2004 |
| JP | 2005-206771 | 8/2005 |
| JP | 2006-231859 | 9/2006 |
| JP | 2006-328225 | 12/2006 |
| JP | 2006-348060 | 12/2006 |
| WO | 2005/035656 | 4/2005 |
| WO | 2005/108501 | 11/2005 |
| WO | 2007/029574 | 3/2007 |

OTHER PUBLICATIONS

Translation of JP 2004-051803, Matsuoka et al., "Biodegradable Resin Foam and Shock Absorbing Material Made of The Same", Feb. 19, 2004.*

* cited by examiner

*Primary Examiner* — Hai Vo
(74) *Attorney, Agent, or Firm* — Fildes & Outland, P.C.

(57) ABSTRACT

Disclosed is a foam sheet made of a biodegradable resin composition. The biodegradable resin composition contains a wax and/or a polyolefin resin. The biodegradable resin is mainly composed of polylactic acid. Natural candelilla wax or paraffin wax is preferable as the wax. Polyethylene is preferable as the polyolefin resin. Also disclosed are a foam article and a molded container made of such a foam sheet wherein the degree of crystallinity of the biodegradable resin is 10% or more.

4 Claims, No Drawings

BIODEGRADABLE RESIN FOAM SHEET, BIODEGRADABLE RESIN FOAM ARTICLE AND BIODEGRADABLE RESIN MOLDED CONTAINER

TECHNICAL FIELD

The present invention relates to a biodegradable resin foam sheet, a biodegradable resin foam article and a biodegradable resin molded container each of which is formed of a biodegradable resin composition, is excellent in moisture barrier property and has heat resistance.

BACKGROUND ART

Plastic foam articles characterized by features such as lightweightness, shock absorbing property, heat insulating property and moldability have hitherto been mainly used as packaging containers and shook absorbing materials. The plastics themselves that have hitherto been used for these products are derived from petroleum resources, and these products cause problems such that these products remain in the natural environment when buried for disposal at the time of being discarded, and these products emit harmful gases and deteriorate incinerators when incinerated for disposal, so as for such problems to emerge as social issues.

In these years, for the purpose of solving these problems, there have been demanded foam articles made of biodegradable resins such as polylactic acid, polybutylene succinate, polycaprolactone, polyethylene succinate and polybutylene terephthalate/adipate which can be degraded by moisture, microbes or the like, and can also be treated for composting in composters. Among these polymers, in particular, polylactic acid has come into use in various applications as an ideal polymer that is a plant-derived raw material produced by polymerizing lactic acid obtained by fermenting materials such as various starches and sugars, and eventually again converted into carbon dioxide gas and water so as to be environmentally recycled on a global scale.

However, these biodegradable resins are high in gas permeability, in particular, high in water vapor permeability, and hence when products susceptible to moisture, products containing moisture in large amounts or other like products are packaged, absorption and release of moisture come to be problems. Consequently, these biodegradable resins have not been practically used yet as foam articles and molded containers.

For the purpose of solving these problems, in JP-A-5-139435, for example, disclosed is a foam container made of a thermoplastic polymer composition mainly composed of polylactic acid or a copolymer of a hydroxycarboxylic acid as a container formed of a biodegradable resin.

However, compositions derived from polylactic acid and aliphatic polyesters are generally high in gas permeability except for a small number of such compositions, do not have functions such as function to prevent the oxidation of the substances in containers caused by permeation of the oxygen in the air and function to prevent the contents in containers from moisture due to water vapor permeation, and hence have never been used for preservation containers.

JP-A-6-287347 and JP-A-9-263651 describe biodegradable laminates in each of which a biodegradable non-foam layer is laminated on the surface layer of a biodegradable foam article. JP-A-2000-109045 describes a heat insulating paper cup in which a biodegradable foam article, a sheet of paper and a sheet of biodegradable film are laminated in this order.

However, the biodegradable resins used in the above-described documents are all high in gas permeability, in particular, in water vapor permeability, and hence when used as packaging containers for products incompatible with moisture, products containing moisture in large amounts or other like products, absorption and release of moisture come to be problems. Consequently, these products in the above-described documents are hardly usable for practical purposes.

Further, for the purpose of solving these problems, JP-A-2003-55569, for example, discloses a biodegradable resin composition including a biodegradable resin, a plate-like filler and a resin-like or wax-like dispersant, and a packaging container using this resin composition.

This resin composition and this packaging container each contain 2 to 70 parts by weight of the plate-like filler and 0.05 to 20 parts by weight of the resin-like or wax-like dispersant are contained in relation to 100 parts by weight of the biodegradable resin, and have a drawback that this resin composition and this packaging container become heavy because the specific gravity of the resin becomes large due to the mixing of a large amount of the plate-like filler. Additionally, this resin composition and this packaging container are poor in heat resistance, and hence this packaging container involves a problem that neither warm water nor boiling water can be substantially poured into this container and this container cannot be substantially used for heating in a microwave oven.

The present inventors have previously reported that foam containers using such aliphatic polyesters such as polylactic acid are improved in heat resistance by promoting the crystallization of the aliphatic polyesters (JP-A-2004-217288). In this document, disclosed is an improvement of the heat resistance of the containers achieved by increasing the degree of crystallinity in portions of the containers. However, the degree of crystallinity of the whole containers cannot be said to be sufficiently achieved, and the gas barrier property of the containers needs to be improved although the containers can be imparted with heat resistance.

DISCLOSURE OF THE INVENTION

Problems to be Solved by the Invention

An object of the present invention is to solve the above-described problems and to provide a biodegradable resin foam sheet, a biodegradable resin foam article and a biodegradable resin molded container each of which has biodegradability, is light in weight, has heat resistance and is excellent in gas barrier property.

Means for Solving the Problems

The present inventors made a diligent study, and consequently have reached the present invention by discovering that the above-described problems can be solved by the following biodegradable resin foam sheet, foam article and molded container.

Specifically, the subject matter of the present invention is as follows.

(1) A biodegradable resin foam sheet made of a biodegradable resin composition, wherein the composition includes a wax and/or a polyolefin resin.

(2) The biodegradable resin foam sheet according to (1), wherein a main component of the biodegradable resin is polylactic acid.

(3) The biodegradable resin foam sheet according to (1) or (2), wherein the wax is one of natural candelilla wax and paraffin wax.

(4) The biodegradable resin foam sheet according to any one of (1) to (3), wherein the polyolefin resin is polyethylene.

(5) The biodegradable resin foam sheet according to any one of (1) to (4), wherein the wax and/or the polyolefin resin is contained in an amount of 0.2 to 10% by mass.

(6) A biodegradable resin foam article formed of the biodegradable resin foam sheet according to any one of the above-described (1) to (5), wherein a degree of crystallinity of a biodegradable resin forming the foam article is 10% or more.

(7) The biodegradable resin foam article according to (6), wherein a water vapor permeability at 40° C. at 100% RH is 50 g·mm/m$^2$/day or less.

(8) A biodegradable resin molded container molded with the biodegradable resin foam sheet according to any one of the above-described (1) to (5), wherein a degree of crystallinity of the biodegradable resin forming the container is 10% or more.

(9) The biodegradable resin molded container according to (8), wherein the water vapor permeability at 40° C. at 100% RH is 50 g·mm/m$^2$/day or less.

Effects of the Invention

According to the biodegradable resin foam sheet, biodegradable resin foam article and biodegradable resin molded container of the present invention, in general, heat resistance and moisture prevention property can be imparted to a biodegradable resin foam article high in water vapor permeability and a biodegradable resin molded container high in water vapor permeability, and hence the biodegradable resin foam article and biodegradable resin molded container can be suitably used as the molded containers or the like for packaging products required to avoid moisture and products conversely required to maintain moisture.

BEST MODE FOR CARRYING OUT THE INVENTION

Hereinafter, the present invention is described in detail.

The biodegradable resin foam sheet of the present invention is produced by foaming a biodegradable resin composition containing a biodegradable resin, and a wax and/or a polyolefin resin. The biodegradable resin preferably contains a biodegradable aliphatic polyester in the main chain thereof as a main component, and specifically contains this component in a content of preferably 70% by mass or more, and more preferably 85% by mass or more.

Examples of the aliphatic polyester used as the biodegradable resin may include the polymers containing, as a main component in a content of 70% by mass or more, the components derived from the following aliphatic polyester polymerization raw materials (1) to (6), wherein the biodegradable resin may also include: block and/or random copolymers of aliphatic polyesters; aliphatic polyesters copolymerized (block or random) in a content of 30% by mass or less with other components such as aromatic polyester, polyether, polycarbonate, polyamide, polyurethane and polyorganosiloxane; and/or the mixtures of these,
wherein (1) hydroxyalkylcarboxylic acids such as glycolic acid, lactic acid and hydroxybutylcarboxylic acid;

(2) aliphatic lactones such as glycolide, lactide, butyrolactone and caprolactone;

(3) aliphatic diols such as ethylene glycol, propylene glycol and butanediol;

(4) oligomers of polyalkylene ethers such as diethylene glycol, triethylene glycol, ethylene/propylene glycol and dihydroxyethylbutane; and polyalkylene glycols such as polyethylene glycol, polypropylene glycol and polybutylene ether;

(5) polyalkylene carbonate such as polypropylene carbonate, polybutylene carbonate, polyhexane carbonate, polyoctane carbonate and polydecane carbonate; and the oligomers corresponding to these polymers; and (6) aliphatic dicarboxylic acids such as succinic acid, adipic acid, suberic acid, azelaic acid, sebacic acid and decanedicarboxylic acid.

Among these aliphatic polyesters, the aliphatic polyesters derived from the hydroxyalkylcarboxylic acids listed in the above-described (1) are high in melting point and preferable from the viewpoint of heat resistance, and further, among such polyesters, polylactic acid is high in melting point and most preferable as the polymer involved in the present invention. Examples usable as polylactic acid include poly-L-lactic acid, poly-D-lactic acid, poly-D,L-lactic acid and the mixtures of these polylactic acids. When the polylactic acid contains the optically active L-lactic acid unit or the D-lactic acid unit in a content of 90 mol % or more, the polylactic acid is higher in melting point, and can be more preferably used from the viewpoint of heat resistance. Additionally, to a degree which does not impair the performance of the polylactic acid resin, the polylactic acid may be copolymers or mixtures with comonomers such as hydroxycarboxylic acids and lactones. Examples of the copolymerizable or mixable hydroxycarboxylic acid monomers and lactone monomers include glycolic acid, 3-hydroxybutyric acid, 4-hydroxybutyric acid, 4-hydroxyvaleric acid, hydroxycaproic acid, glycolide, β-propiolactone, β-butyrolactone and ε-caprolactone. The polylactic acid resin may be copolymerized with aliphatic polyesters obtained by combining the diols and the dicarboxylic acids listed in the above-described (3), (4) and (6), and may also be copolymerized with the carbonates listed in the above-described (5).

These polylactic acid resins can be produced by polymerizing lactic acid with heretofore known methods. Examples of the polymerization method include a method in which polymerization is carried out by direct dehydration-condensation of lactic acid and a method in which polylactic acid is obtained by ring-opening polymerization of lactide that is a cyclic dimer of lactic acid. These polymerization reactions may be carried out in a solvent, and the reactions may be efficiently carried out by using a catalyst or an initiator if necessary. These methods may be appropriately selected in consideration of the desired molecular weight and the desired melt flow rate.

In the present invention, the biodegradable resin is preferably mixed with a crosslinking agent and/or a radical polymerization initiator. By mixing these agents, the degree of crosslinking of the biodegradable resin can be increased, the degree of branching of the biodegradable resin can be regulated, and the biodegradable resin becomes excellent in moldability in molding such as extrusion foaming molding.

Examples of the crosslinking agent include a (meth)acrylic acid ester compound, polyvalent (meth)acrylate, diisocyanate, polyvalent isocyanate, calcium propionate, polyhydric carboxylic acid, polyvalent carboxylic acid anhydride, polyhydric alcohol, a polyvalent epoxy compound, metal alkoxide and a silane coupling agents. In consideration of the stability, productivity and operational safety of the reaction, a (meth)acrylic acid ester compound is most preferable.

Preferable as the (meth)acrylic acid ester compound is a compound that has two or more (meth)acryl groups in the molecule thereof or a compound that has one or more (meth) acryl groups and one or more glycidyl or vinyl groups because such a compound is high in reactivity with the biodegradable resin, scarcely remains as monomers, is relatively low in toxicity, and is low in degree of coloration of the resin. Specific examples of such a compound include: glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycol dimethacrylate, polypropylene glycol diacrylate, polytetramethylene glycol dimethacrylate, diethylene glycol dimethacrylate and ethylene glycol dimethacrylate; the copolymers of the above-listed (meth)acrylic acid ester compounds different in the alkylene length in the alkylene glycol portion; and further, butanediol methacrylate and butanediol acrylate.

The mixing amount of the crosslinking agent is preferably 0.005 to 5 parts by mass, more preferably 0.01 to 3 parts by mass, and most preferably 0.1 to 1 part by mass in relation to 100 parts by mass of the biodegradable resin. When the mixing amount is less than 0.005 part by mass, the degree of crosslinking tends to be insufficient, and when the mixing amount exceeds 5 parts by mass, the crosslinking is performed to an excessively high degree, and hence the operability tends to be disturbed.

As the radical polymerization initiator, organic peroxides satisfactory in dispersibility are preferable. Specific examples of such organic peroxides include: benzoyl peroxide, bis(butylperoxy)trimethylcyclohexane, bis(butylperoxy)cyclododecane, butylbis(butylperoxy)valerate, dicumyl peroxide, butylperoxybenzoate, dibutyl peroxide, bis(butylperoxy) diisopropylbenzene, dimethyldi(butylperoxy)hexane, dimethyldi(butylperoxy)hexyne and butylperoxycumene.

The mixing amount of the radical polymerization initiator is preferably 0.01 to 10 parts by mass, more preferably 0.1 to 5 parts by mass, and most preferably 0.15 to 3 parts by mass in relation to 100 parts by mass of the biodegradable resin. When the mixing amount is less than 0.01 part by mass, the degree of crosslinking tends to be insufficient, and when the mixing amount exceeds 10 parts by mass, the reactivity is saturated so as to be unfavorable from the viewpoint of cost.

In the present invention, a wax and/or a polyolefin resin is required to be contained in the biodegradable resin composition. The wax and/or the polyolefin resin is dispersed in and is made to penetrate into the amorphous portion of the biodegradable resin so as to provide the resin composition with excellent moisture barrier property.

As the wax component, a natural wax is preferable. Examples of the natural wax include: plant waxes such as candelilla wax, carnauba wax, jojoba wax, rice wax and Japanese wax; animal waxes such as shellac wax and lanolin wax; mineral waxes such as montan wax and ozokerite wax; and petroleum waxes such as paraffin wax and microcrystalline wax. Among the above-listed waxes, candelilla wax, carnauba wax and paraffin wax are more preferable because these waxes have appropriate biodegradability, and exhibits excellent moisture prevention property through mixing with the biodegradable resin; and candelilla wax is most preferable.

Examples of the polyolefin resin include polyethylene, polypropylene and modified resins of these; among such resins, polyethylene is preferable. As the polyethylene, any of low density polyethylene, medium density polyethylene, high density polyethylene and linear low density polyethylene can be applied, and mixtures of these polyethylenes may also be applied. Among these polyethylenes, a low density polyethylene having branched structure and the linear low density polyethylene can be more preferably used.

Only a small amount of mixing of the wax and/or the polyolefin resin can provide large moisture prevention property. Accordingly, the mixing proportion in the biodegradable resin composition is preferably 0.2 to 10% by mass, more preferably 0.5 to 8% by mass, and most preferably 0.7 to 5% by mass. When the mixing proportion of the wax and/or the polyolefin resin exceeds 10% by mass, the moisture barrier property reaches a saturation region, and the bleed-out amount at the time of the foam sheet formation becomes large, and hence the operability, the exterior appearance and the quality tend to be degraded. On the other hand, when the mixing proportion of the wax and/or the polyolefin resin is less than 0.2% by mass, the moisture barrier property is degraded, and hence the resin composition containing such a mixing proportion of the wax and/or the polyolefin resin is not suitable for application to containers for preserving products required to avoid moisture and products conversely required to maintain moisture.

In the production of the biodegradable resin composition, as a foaming adjuster, inorganic substances such as talc, calcium carbonate, borax, zinc borate and aluminum hydroxide can be added beforehand. The resin can also be added with additives such as coloring pigments, dyes and inorganic substances. When such additives are added, the additives may be directly kneaded with the resin; however, it is usually preferable to prepare master batches of the additives, in consideration of the dispersibility of each of the additives, and to knead the master batches with the resin.

Among the inorganic fillers and organic compounds, a compound having an effect of promotion of crystallization may also be added. Examples of such compounds include: inorganic fillers such as a layer silicate, talc, titanium oxide and silicon oxide; and organic compounds such as erucamide, ethylene bisstearamide and ethylene bisoleamide.

As long as the properties of the biodegradable resin composition are not significantly impaired, the following agents may also be added in the biodegradable resin composition: pigments, fragrance ingredients, dyes, delustering agents, thermostabilizers, antioxidants, plasticizers, lubricants, release agents, light resisting agents, weather resisting agents, flame retardants, antibacterial agents, surfactants, surface modifiers, antistatic agent, fillers and terminal sealing agents.

Usable examples of the thermostabilizers and antioxidants include hindered phenols, phosphorus compounds, hindered amines, sulfur compounds, copper compounds, halides of alkali metals and mixtures of these compounds.

Examples of the inorganic fillers among the fillers include talc, calcium carbonate, zinc carbonate, wollastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolite, hydrotalcite, metal fibers, metal whisker, ceramic whisker, potassium titanate, boron nitride, graphite, glass fibers and carbon fibers. Examples of the organic fillers among the fillers include naturally occurring polymers such as starch, cellulose microparticles, wood powder, bean curd lees, chaff and bran, and denatured materials of these materials.

Examples of the terminal capping agents include carbodiimide compounds, oxazoline compounds and epoxy compounds.

No particular constraint is imposed on the method for mixing in the biodegradable resin a crosslinking agent, a radical polymerization initiator, additives and other thermoplastic resins; after the resin has been heated to be melted as usual to prepare a molten resin, the molten resin may be kneaded with these agents by means of a kneading method which uses a single screw extruder, a double screw extruder, a roll kneader or a Brabender kneader. A static mixer or a dynamic mixer may be effectively used in combination with the above-described kneaders. These agents may also be added at the time of polymerization of the biodegradable resin.

The biodegradable resin composition can be produced by means of the heretofore known methods. For example, a biodegradable resin, and a wax and/or a polyolefin resin, and according to need, a crosslinking agent, an organic peroxide as a radical polymerization initiator, a foaming nucleus agent and a foaming aid are mixed. No particular constraints are imposed on the mixing method and the mixing apparatus; however, the ingredients are preferably treated by continuous metering and mixing from the viewpoints both of industry and of quality. For example, a weighed powdery organic peroxide, a weighed powdery foaming nuclei agent and the like are subjected to dry blending with the chips of the biodegradable resin, the mixture thus obtained is melt-kneaded with a single screw extruder, a double screw kneading extruder or the like, and a crosslinking agent can be injected from a midway location of the extruder. When the organic peroxide is liquid, a solution of a mixture of the organic peroxide and the crosslinking agent may be injected for kneading from a midway location of the extruder. As another method to be adopted when a wax is added, the wax is beforehand heated to be melted to around 100° C., and the molten wax may be injected for kneading from a midway location of the extruder by using a quantitative liquid-feeding device. At the time of melt-kneading, in addition to screw kneading, subsequent kneading with a static mixing machine and/or a dynamic mixing machine may be carried out. When a functional agent such as a coloring agent is added for the purpose of imparting a function to a foam article, a master batch added with the functional agent is beforehand prepared, the master batch is mixed with other raw materials by using a metering mixing apparatus based on jet coloring or the like, and then the mixture thus obtained may be fed to an extruder. By extruding the thus melt-kneaded biodegradable resin composition in a strand shape and by cutting after cooling the extruded composition to an appropriate length, the biodegradable resin composition pellets can be produced.

The biodegradable resin foam sheet of the present invention is formed of the above-described biodegradable resin composition. No particular constraints are imposed on the foaming forms of the biodegradable resin foam sheet, the biodegradable resin foam article and the biodegradable resin molded container. However, the foaming forms are preferably of closed cell from the viewpoint of improving the gas barrier property, and from the viewpoint of preventing the bleeding and leaking of the content from the molded container. The foaming size is preferably 0.001 to 2 mm, and more preferably 0.01 to 2 mm. When the foaming size is less than 0.001 mm, the lightweightness of the container tends to be poor, and when the foaming size exceeds 2 mm, the strength of the container becomes insufficient and the quality grade of the container is impaired as the case may be.

For the purpose of making the biodegradable resin foam sheet contain foaming, a common foaming agent can be used. No particular constraint is imposed on the type of the foaming agent; examples of the foaming agent include: inorganic inert gas foaming agents such as carbon dioxide gas, nitrogen and air; chemical pyrolysis foaming agents such as azodicarbonamide, azobisisobutyronitrile, 4,4'-oxybisbenzenesulfonyl hydrazide, benzenesulfonyl hydrazide and sodium bicarbonate; and evaporation foaming agents such as propane, butane, pentane, hexane and alternatives for chlorofluorocarbon. Mixtures of two or more of these foaming agents may also be used.

It is preferable to add, together with the foaming agent, a foaming nucleus agent and a foaming aid to the biodegradable resin composition. The foaming nucleus agent is effective for the purpose of forming nucleus and growing foaming from the thus formed nuclei. The foaming aid is effective for the purpose of uniformly distributing the foaming.

Examples of the foaming nucleus agent include: inorganic foaming nucleus agents such as diatomite, calcined pearlite, kaolin zeolite, bentonite, clay, silica fine powder, borax, zinc borate, aluminum hydroxide, talc, glass, limestone, calcium silicate, calcium sulfate, calcium carbonate, sodium hydrogen carbonate, magnesium carbonate, aluminum oxide and ferric carbonate; and organic foaming nucleus agents such as charcoal, cellulose, starch, citric acid and cellulose derivatives. These foaming nucleus agents may be used in combinations without causing any inconvenience. The addition amount of the foaming nucleus agent is preferably 0.1 to 5% by mass. When the addition amount is less than 0.1% by mass, the effect of the foaming nucleus agent is not recognized, and when the addition amount exceeds 5% by mass, foam breaking is caused.

Examples of the foaming aid include calcium stearate, magnesium stearate and stearic acid. The addition amount of the foaming aid is preferably 0.01 to 2% by mass. When the addition amount is less than 0.01% by mass, the effect of the foaming aid is not recognized, and when the addition amount exceeds 2% by mass, the growth of the foaming nucleus and the growth of the foaming tend to be inhibited.

No particular constraint is imposed on the method for producing the biodegradable resin foam sheet of the present invention, and the melt-extrusion foaming method can be used for producing the biodegradable resin foam sheet. Specifically, the above-described biodegradable resin composition pellets are dried, and then fed to the melt-extrusion foaming apparatus. When the pellets are fed, a lubricant, a foaming agent, a foaming nucleus agent and other functional agents may be dry blended. When the foaming agent is carbon dioxide gas or an evaporation foaming agent, the foaming agent is quantitatively fed from the central portion of the apparatus, dissolved and dispersed, and then a foaming discharge is carried out through a T-die, a circle die or the like. Then, this discharged foam sheet-like product is uniformly cooled, and then once taken up or taken off to be cut to an optional length. The biodegradable resin foam article and the biodegradable resin molded container of the present invention can be produced by heat treatment molding of this foam sheet.

As for the foam article and the molded container of the present invention, the degree of crystallinity of the biodegradable resin forming the foam article and the molded container is required to be 10% or more. The degree of crystallinity can be determined as described below. When the degree of crystallinity is low, the heat resistance becomes poor, and additionally, the gas barrier performance is also degraded, and disadvantageously the content in the molded container is oxidized and moistened. The upper limit of the degree of crystallinity is different depending on the condition and the form of the applied biodegradable resin; the higher the upper limit of the degree of crystallinity, the better.

In the present invention, examples of the method for producing a foam article formed of a biodegradable resin having a degree of crystallinity of 10% or more include a method in which a foam sheet is heat treated with a clearance calender, a double belt press machine or the like. Examples of the heat treatment method include a method in which the treatment object is maintained for a predetermined period of time at a temperature set so as to be [the glass transition temperature (Tg) of the biodegradable resin +20° C. or higher] and [the melting point (Tm) of the same resin −20° C. or lower], and thereafter the treatment object is cooled to a temperature equal to or lower than Tg. Additionally, it is preferable to set the linear pressure at 1 to 100 kg/cm by adjusting the clearance between the rolls or between the belts at the time of heat treatment; the increase of the linear pressure can increase the degree of crystallinity of the biodegradable resin. When a foam article having a high degree of crystallinity is further heat molded, the foam article is embrittled as the case may be; accordingly, when an obtained foam article is further heat molded, it is preferable to control the degree of crystallinity of the biodegradable resin to be low.

Examples of the method for setting at 10% or more the degree of crystallinity of the biodegradable resin in the molded container of the present invention include a method in which in the below described method for producing a molded container, the temperature conditions such as the draw-molding temperature and the die temperature are set so as to be [the glass transition temperature (Tg) of the biodegradable resin being used +20° C. or higher] and [the melting point (Tm) of the same Resin −20° C. or lower], the treatment object is maintained at such a temperature for a predetermined period of time, and thereafter, the treatment object is cooled to a temperature equal to or lower than Tg. For the purpose of further promoting the crystallization of the resin, it is preferable to set the die temperature so as to fall in a temperature range from [the crystallization temperature (Tc) of the biodegradable resin being used −20° C. or higher] to [Tc +20° C. or lower]. The crystallization of the resin can also be realized by beforehand heat treating for a predetermined period of time the biodegradable resin sheet, immediately before the molding, at temperatures from (Tg +20° C.) to (Tm −20° C.), more preferably from (Tc −20° C.) to (Tc +20° C.), or by thermosetting for a predetermined period of time the container after molding for a predetermined period of time at temperatures from (Tg +20° C.) to (Tm −20° C.), more preferably from (Tc −20° C.) to (Tc +20° C.).

When these heat treatment temperatures are lower than (Tg +20° C.), the degree of crystallinity of the resin of the obtained container cannot be sufficiently increased, and the gas barrier property becomes insufficient. On the other hand, when the these heat treatment temperatures exceed (Tm −20° C.), uneven thickness is caused, the orientation is disturbed, and consequently the shock resistance is degraded as the case may be, and disadvantageously blowdown occurs due to the decrease of the viscosity or other problems are caused as the case may be.

The maintaining time at temperatures from (Tg +20° C.) to (Tm −20° C.) depends on the crystallization speed index of the biodegradable resin being used, and hence cannot be specified unconditionally. However, such a maintaining time is preferably set to be at least 3 seconds, preferably 5 seconds and more preferably 10 seconds or more in the die controlled exactly at a predetermined temperature falling within the above-described range. When such a maintaining time is shorter than 3 seconds, the degree of crystallinity cannot be increased sufficiently.

No particular constraint is imposed on the method for producing the molded container of the present invention, and there can be adopted a method in which the above-described foam sheet is subjected to draw-molding such as vacuum molding, pneumatic molding and vacuum pneumatic molding. The molded container may be obtained by alternative production methods. Adoptable examples of such alternative production methods that use the above-described biodegradable polymer composition include: a blow molding method typified by a direct blow method, an injection blow molding method and a stretch blow molding method; and a common injection molding method, a gas injection molding method and an injection press molding method. The cylinder temperature in injection molding is required to be equal to or higher than Tm of the biodegradable resin or the flow initiation temperature, and is required to fall preferably in a range from 150 to 230° C., and more preferably in a range from 160 to 220° C. Additionally, the die temperature is recommended to be set at 110±20° C. When the molding temperature is too low, short occurs at the time of molding, molding becomes unstable and overload tends to occur. Conversely, when the molding temperature is too high, disadvantageously, the biodegradable resin is decomposed, and the obtained molded article is decreased in strength and colored.

The biodegradable resin foam article and the biodegradable resin molded container of the present invention are required to contain foaming from the viewpoints of light-weightness, heat insulating property and heat retaining property. In this connection, the foaming ratio of the resin is preferably 1.0 to 50. When the foaming ratio of the resin is low, the strength is easily obtained even for thin thickness. When the foaming ratio exceeds 4, the foam article and the molded container come to be light in weight, and excellent in heat insulating and retaining property and vibration absorbing property. However, when the foaming ratio exceeds 50, the mechanical strength is insufficient, and the performances as a container cannot be satisfied as the case may be.

The biodegradable resin foam article and the biodegradable resin molded container of the present invention each have a water vapor permeability at 40° C. at 100% RH of preferably 50 g·mm/m$^2$/day or less, more preferably 40 g·mm/m$^2$/day or less. When the water vapor permeability exceeds 50 g·mm/m$^2$/day, the molded container is not suitable for preserving products required to avoid moisture and products conversely required to maintain moisture.

The biodegradable resin foam article and the biodegradable resin molded container of the present invention have an oxygen permeability at 20° C. at 90% RH of preferably 1000 ml/m$^2$/day/MPa or less, and more preferably 600 ml/m$^2$/day/MPa or less. When the oxygen permeability exceeds 1000 ml/m$^2$/day/MPa, the components in the foam article and the molded container are oxidized and deteriorated as the case may be.

The water vapor permeability and the oxygen permeability of the biodegradable resin foam article can be controlled by the amounts of the wax and/or the polyolefin mixed in the composition forming the foam article.

Examples of alternative forms of the biodegradable resin foam article and the biodegradable resin molded container of the present invention may include forms in which the outer surface and/or the inner surface of each of the biodegradable resin foam article and the biodegradable resin molded container is laminated with a layer formed of a biodegradable resin and containing no foaming.

In this case, the degree of crystallinity of the biodegradable resin forming the layer containing no foaming is also preferably 10% or more.

Examples of the layer containing no foaming include common forms of films, spunbond nonwoven fabrics and sheets all containing no foaming. Materials such as porous films and porous sheet are also applicable. The thickness values of these layers are preferably 5 μm or more, and more preferably 10 to 500 μm. The layers containing no foaming may be colored and printed with letters and patterns.

No particular constraint is imposed on the shape of the biodegradable resin molded container of the present invention. The opening of the container may be circular, triangular, quadrangular or polygonal. The opening may also be provided with a flange therearound. For the purpose of containing food, goods, drugs and the like, the container is preferably drawn in a depth of 2 mm or more, and the drawing ratio of the container is preferably 0.1 to 5, and more preferably 0.5 to 3. The drawing ratio of a container means the ratio (L/D) between the approximate diameter (D) of the sectional area of the container and the depth (L) of the container.

In consideration of the required strength, the thickness of the container is preferably 0.5 mm or more, and more preferably 1.0 to 5.0 mm. When the thickness exceeds 5.0 mm, the container becomes bulky, heavy and additionally, poor in moldability.

The biodegradable resin foam article of the present invention has lightweightness and heat resistance, and is excellent in mechanical, physical properties; and hence the application fields of the concerned foam article include a packaging and packing field in which the concerned foam article is useful for containers, shock absorbers in iron containers, returnable containers and partitioning plates in containers; and a stationery field in which the surface smoothness and rigidity of the concerned foam article are positively used and the foam article is useful for binders, cut files, cut boxes, antibacterial stationeries for clean rooms, and others.

In the field of construction and civil engineering, the biodegradable resin foam article of the present invention is useful for core materials for use in partitioning, sign plates, shock absorbing wall materials, mats used in camping and others.

Further, the biodegradable resin foam article of the present invention has biodegradability and is capable of being recycled, and hence, is useful, in the applications to daily life commodities, as a fusuma (Japanese sliding door) paper, a shoji (Japanese sliding paper screen) paper, a wallpaper, an entrance mat, a toilet mat, a sink mat, a bath mat, a home planting mat, a mat in a hospital, a blind material, a fence for preventing trespassing of unconfined animals such as homeless dogs and cats, and the like, and is useful, in the applications to agricultural materials, as a seed bed, a seedling base case in hydroponic culture and the like.

In the field of home electric appliances, the rigidity, surface property and printability of the biodegradable resin foam article of the present invention are positively used, and the concerned foam article is useful for products such as cases for video cameras and video cassettes, and is useful, in the field of fishing industry materials, for fishing net floats, fishing floats, oil fence floats, cool boxes and the like. Additionally, the concerned foam article may also be usable for personal computers, home electric appliances, automobile parts and the like.

Examples of the application of the biodegradable resin molded container of the present invention include food containers, agricultural and gardening containers, blister pack containers and press-through pack containers. Specific examples of the food containers include trays for fresh food, containers for instant food, containers for fast food, lunch boxes and confectionery boxes. Specific examples of the agricultural and gardening containers include seedling raising pots. Specific examples of the blister pack containers include, in addition to applications to food, packaging containers for various groups of commodities such as office supplies, toys and dry batteries. Additionally, as the container in the present invention, containers for fluid substances are cited. Specific examples of the containers for fluid substances include: beverage cups and beverage bottles for dairy products, soft drinks and alcoholic beverages; temporary preservation containers for seasonings such as soy sauce, sauce, mayonnaise, ketchup and edible oil; containers for shampoo, conditioner and the like; containers for cosmetics; containers for agrichemicals; various tanks for automobiles; printer ink cartridges and toner bottles; Indian ink containers; and paste containers.

EXAMPLES

Next, the present invention is described specifically on the basis of examples. The measurements and evaluations of the various properties in the following Examples and Comparative Examples have been carried out on the basis of the following methods.

(1) Molecular Weight

The molecular weight of each sample was determined relative to polystyrene standards by analyzing at 40° C. by using a gel permeation chromatography (GPC) apparatus (manufactured by Shimadzu Corp.) equipped with a differential refractive index detector, and by using tetrahydrofuran (THF) as the eluent. Samples scarcely soluble in THF were dissolved in a small amount of chloroform, and then diluted with THF to prepare measurement samples.

(2) Glass Transition Temperature (Tg) and Melting Point (Tm) (° C.)

The measurement of each sample was carried out by using a differential scanning calorimeter (DSC-7, manufactured by PerkinElmer Corp.) at a temperature increase rate of 20° C./min, and the melting endothermic curve was thus obtained, and the temperatures giving an initial extreme value and the maximum value in this curve were defined as the glass transition temperature (Tg) and the melting point (Tm), respectively.

(3) Crystallization Temperature (Tc) (° C.)

The differential scanning calorimeter (DSC-7, manufactured by PerkinElmer Corp.) was used. Each sample was heated to Tm +30° C. at a temperature increase rate of 20° C./min, thereafter the sample was cooled to −50° C. at a temperature decrease rate of 20° C./min, and a melting endothermic curve was thus obtained. The temperatures giving an initial extreme value in this curve was defined as the crystallization temperature (Tc).

(4) Crystallization Speed Index (Min)

A DSC apparatus (Pyrisl DSC, manufactured by PerkinElmer Corp.) was used. Each sample was heated from 20° C. to 200° C. at a temperature increase rate of +500° C./min, thereafter maintained at 200° C. for 5 minutes to be crystallized. The degree of crystallinity eventually reached was defined as 1, and the time required for the degree of crystallinity to reach 0.5 was determined as the crystallization speed index (min).

(5) Degree of Crystallinity (%)

Specimens were sampled from the foam articles and molded containers, and the specimens were subjected to the measurement with an X-ray diffraction apparatus (RAD-rBX, manufactured by Rigaku Denki Kogyo, Co., Ltd.) on the basis of the WAXD reflection powder method (X-ray: Cu—Kα ray/50 kV/200 mA, scan speed: 2°/min)

Specifically, first, several samples falling approximately within a degree of crystallinity range from 0.1 to 40% were prepared, and the density A of each sample was measured by a density method measurement (dry densimeter). On the basis of the assumption that a perfect amorphous sample had a density of 1.245 (degree of crystallinity: 0%) and a perfect crystal sample had a density of 1.290 (degree of crystallinity: 100%) (as for these values, several different values have been proposed, and hence, in the present invention, these values were used), the degree of crystallinity X (%) of each sample was calculated from the following formula:

$$1.245(1-X/100)+1.29 \cdot X/100=A$$

and thus the degree of crystallinity was determined on the basis of the density method. The X-ray intensity of each sample was measured, and the correlation between the degree of crystallinity based on the density method and the X-ray measurement results was obtained.

The samples used in this measurement were prepared as follows: the samples were melt-press molded at 200° C. to a thickness of 1 mm or less, immediately thereafter immersed in liquid nitrogen to yield samples having a degree of crystallinity close to 0%, and then the samples were subjected to appropriately different heat treatments to prepare a plurality of samples different in the degree of crystallinity.

Next, the X-ray intensities of the samples selected for measurement were measured, the peaks belonging to crystalline and amorphous portions were separated by means of a multiple peak separation analysis, and the degrees of crystallinity of the resin samples were determined from the above-described correlation.

(6) Melt Flow Rate (MFR) (g/10 Min)

The melt flow rate was measured at a temperature of 190° C. in conformity with the method described in the D conditions of JIS K7210.

(7) Foaming Ratio

The apparent density of each obtained foam article was derived by dividing the mass of the foam article by the volume measured as the volume increment obtained by immersing the foam article in water, and then the foaming ratio of the foam article was derived by dividing the true density of the resin forming the foam article by the apparent density.

(8) Water Vapor Permeability

By using a moisture permeation measurement system (PERMATRAN-W3/31MW, manufactured by Mocon Co.), the water vapor permeability (g/m$^2$/day) at 40° C. at 100% RH was measured, and the value (g·mm/m$^2$/day) converted by the thickness (mm) of each sample was determined. The smaller this value, the better the moisture prevention property.

(9) Oxygen Permeability

By using an oxygen permeation measurement system (OX-TRAN 2/20 MH, manufactured by Mocon Co.), the oxygen permeability (ml/m$^2$/day/MPa) at 20° C. at 90% RH was measured. The smaller this value, the better the gas barrier property.

(10) Operability

By using an extrusion foaming apparatus, the operation conditions at the time of producing each foam article and the conditions of the sheet were observed, and the operability was evaluated according to the following standards.

E (excellent): Operation can be carried out satisfactorily without any problems.

G (good): Almost no eye mucus-like matter occurs on the discharge face of the die, the surface conditions are satisfactory, and operation can be made.

A (average): Eye mucus-like matter slightly occurs on the discharge face of the die, but operation is free from problems, and the surface conditions are satisfactory.

P (poor): Eye mucus-like matter occurs on the discharge face of the die, operation conditions are poor, and the surface conditions of the sheet are rough.

(11) Moldability

The moldability was observed when containers were molded by using a vacuum pneumatic molding machine (manufactured by Asano Laboratories Co., Ltd.), and the moldability was evaluated according to the following standards.

G (good): Satisfactory molding can be made without any problems.

A (average): Some problems occur, but the properties of the container are free from problems, and molding can be made satisfactorily.

P (poor): Molding is impossible because of problems such as too thin thickness, uneven thickness, rupture and blow-down.

(12) Heat Resistance-1

A 20-cm long×20-cm wide specimen was prepared from a sheet, heat treated with a hot air drying machine at a temperature of 100° C. for a treatment time of 30 minutes, the shrinkage rate of the specimen was measured and the conditions of the specimen was observed. The evaluation of the specimen was carried out according to the following standards.

E (excellent): Shrinkage and surface conditions undergo no changes at all.

G (good): Shrinkage rate is less than 3%, and surface conditions undergo no changes.

A (average): Shrinkage rate is 3 to 10%, and the surface is rough and is deformed.

P (poor): Shrinkage rate exceeds 10%, the surface is rough and the shape undergoes deformation.

(13) Heat Resistance-2

In a container as a sample, 50 ml of water at ordinary temperature was placed, the opening of the container was sealed with wrapping film for food packaging, the water was heated with a 500-W microwave oven for 2 minutes, the conditions of the container after heating was visually observed, and the evaluation was carried out according to the following standards.

E (excellent): No changes are found at all.

G (good): The surface is slightly rough, but no deformation is found.

A (average): Surface is rough, and deformation is found.

P (poor): Almost no original shape is maintained.

Examples 1 to 6 and Comparative Examples 1 to 4

A poly-L-lactic acid (manufactured by NatureWorks LLC, hereinafter abbreviated as "PLA") having a glass transition temperature (Tg) of 57° C., a melting point (Tm) of 168° C. and a weight average molecular weight of 100,000 was used, and dry blended with 2.0% by mass of talc of 2.5 μm in average particle size, and thereafter the mixture thus obtained was fed to a double screw kneader (Model PCM-45, manufactured by Ikegai Corp.) set at a temperature of 200° C. Additionally, ethylene glycol dimethacrylate as a crosslinking agent and dibutyl peroxide as a radical polymerization initiator (as a mixed solution with the mass ratio of 1:2) were used and injected to be kneaded from a midway location of the double screw kneader in such a way that the contents of these two agents were 0.15 part by mass and 0.30 part by mass, respectively, in relation to 100 parts by mass of the resin component, and thus the pellets of the biodegradable resin were obtained.

The pellets after having been dried gave a MFR of 1.5 g/10 min, a glass transition temperature (Tg) of 57° C., a melting point (Tm) of 167° C., a crystallization temperature (Tc) of 110° C., and a crystallization speed index of 1.5 (min).

The biodegradable resin pellets thus obtained were used, and subjected to dry blending with candelilla wax (manufactured by Toakasei Co., Ltd.) in a varying addition amount as specified in Table 1, and the mixture thus obtained was fed to a double screw kneading extruding foam manufacturing machine (Model TEM-48BS, manufactured by Toshiba Machine Co., Ltd.). The mixture was melted at a temperature of 200° C., and a foam sheet was produced at a discharge rate of 100 kg/h, with carbon dioxide gas added as a foaming agent in a content of 1.4% by mass. The foam sheet thus obtained was a uniform sheet formed of closed cells, having a foaming ratio of 6.0 and a thickness of 2.2 mm.

The sheet was fed to a double belt press machine (manufactured by Sandvik Co., Ltd.) to be heat treated. The heat treatment conditions involved were such that the clearance was 2.0 mm, the linear pressure between the belts was 24 kg/cm, and the heat treatment temperature was as shown in Table 1. Under such conditions, biodegradable resin foam articles were produced. The results obtained for these foam articles are shown in Table 1.

Examples 7 to 9

In place of candelilla wax, paraffin wax (paraffin wax 155, manufactured by Nippon Seirou Co., Ltd.) [Example 7], an alcohol-type wax (OX1949, manufactured by Nippon Seirou Co., Ltd.) [Example 8], and a low density polyethylene (manufactured by Japan Polychem Corp.) [Example 9] were used. The addition amount of carbon dioxide gas was set at were mixed in a mixing ratio of 30/70 (mass ratio), the mixture thus obtained was dry blended with 2.0% by mass of talc of 2.5 μm in average particle size, and thereafter the mixture thus obtained was fed to a double screw kneader (Model PCM-45, manufactured by Ikegai Corp.) set at a temperature of 190° C. Additionally, glycidyl dimethacrylate and dibutyl peroxide (as a mixed solution with the mass ratio of 1:2) were used and injected to be kneaded from a midway location of the double screw kneader in such a way that the contents of these two agents were 0.09 part by mass and 0.18 part by mass, respectively, in relation to 100 parts by mass of the resin component, and thus the pellets of the biodegradable resin were obtained.

The pellets after having been dried gave a MFR of 2.0 g/10 min, a glass transition temperature (Tg) of 57° C., melting points (Tm) of 115° C. and 167° C. showing themselves as double peaks, a crystallization temperature (Tc) of 89° C., and a crystallization speed index of 1.2 (min).

The biodegradable resin pellets thus obtained were used, and added with the alcohol-type wax OX1949 in an amount of 2.0% by mass. Then, a foam sheet was produced otherwise in the same manner as in Example 8.

The sheet was fed to the double belt press machine to be heat treated. The heat treatment conditions involved were such that the clearance was 2.0 mm, the linear pressure between the belts was 24 kg/cm, the heat treatment temperature was 100° C., and the treatment time was 1 minute. Under such conditions, a biodegradable resin foam article was produced. The results obtained for the foam article are shown in Table 1.

TABLE 1

| | | | Examples | | | | | | | | | | Comparative Examples | | | |
|---|---|---|---|---|---|---|---|---|---|---|---|---|---|---|---|---|
| | | | 1 | 2 | 3 | 4 | 5 | 6 | 7 | 8 | 9 | 10 | 1 | 2 | 3 | 4 |
| Composition | Biodegradable resin | | PLA | PLA | PLA | PLA | PLA | PLA | PLA | PLA | PLA | PLA/PBS | PLA | PLA | PLA | PLA |
| | Wax/polyolefin | Type | CW | CW | CW | CW | CW | CW | PW | AW | LDPE | AW | — | CW | — | CW |
| | | Content (%) | 0.2 | 1.0 | 5.0 | 10.0 | 1.0 | 1.0 | 1.0 | 1.0 | 10.0 | 2.0 | 0 | 1.0 | 0 | 30 |
| Operability | | | E | E | G | A | E | E | E | E | E | G | E | E | E | P |
| Conditions | Heat treatment temperature (° C.) | | 110 | 110 | 110 | 110 | 90 | 130 | 110 | 110 | 110 | 100 | 80 | 60 | 110 | — |
| | Heat treatment time (sec) | | 60 | 60 | 60 | 60 | 20 | 20 | 60 | 60 | 60 | 20 | 60 | 30 | 60 | — |
| Properties of foam article | Foaming ratio | | 5.8 | 5.8 | 5.7 | 5.6 | 5.8 | 5.8 | 5.9 | 5.8 | 5.9 | 5.8 | 5.9 | 5.7 | 5.9 | — |
| | Thickness (mm) | | 2.0 | 2.0 | 1.9 | 1.8 | 1.9 | 1.8 | 1.8 | 1.7 | 1.8 | 1.8 | 1.9 | 1.9 | 2.0 | — |
| | Degree of crystallinity (%) | | 58 | 55 | 54 | 50 | 12 | 58 | 55 | 54 | 54 | 13 | 6 | 2 | 55 | — |
| | Heat resistance-1 | | E | E | E | G | G | E | E | E | E | G | A | A | E | — |
| | Water vapor permeability (g · mm/m$^2$/day) | | 46 | 22 | 15 | 12 | 38 | 20 | 21 | 18 | 15 | 26 | 150 | 75 | 72 | — |
| | Oxygen permeability (ml/m$^2$/day/MPa) | | 383 | 265 | 220 | 200 | 297 | 180 | 253 | 150 | 250 | 272 | 1366 | 965 | 1860 | — |

—: Unevaluable;
PLA: polylactic acid; PBS: polybutylene succinate;
CW: Candelilla wax; PW: Paraffin wax 155; AW: Alcohol-type wax OX1949; LDPE: Low density polyethylene 1.5% by mass. Foam sheets were produced otherwise in the same manner as in Example 2. The obtained foam sheets were each a uniform sheet formed of closed cells, having a foaming ratio corresponding to 7 and a thickness of 2.0 mm.

These sheets are each fed to the double belt press machine, and heat treated in the same manner as in Example 2 to produce biodegradable resin foam articles. The results obtained for these foam articles are shown in Table 1.

Example 10

A polybutylene succinate (hereinafter abbreviated as PBS) having a glass transition temperature (Tg) of −32° C., a melting point (Tm) of 115° C. and a MFR of 30 g/10 min and PLA As clear from Table 1, in Examples 1 to 4, the water vapor permeability tends to be decreased with the increase of the wax content, the degree of crystallinity of each of the resins is high in level, and thus foam articles extremely excellent in all of the moisture barrier property, heat resistance and resistance to oxygen permeation were obtained. In each of Examples 5 and 6, the heat treatment temperature was altered. In particular, in Example 5, the heat treatment temperature was decreased and the other conditions were the same as in Example 2; the decreased heat treatment temperature resulted in the decreased degree of crystallinity, and also tended to decrease the heat resistance and the moisture prevention property as compared to Example 2. However, the inclusion of a wax and the degree of crystallinity of 10% or more in Example 5 gave the results that the moisture prevention property and the heat resistance of Example 5 were both satisfactory.

containers (opening inner diameter=150 mm, bottom inner diameter=60 mm, drawing ratio (L/D) of container=0.5) under the conditions specified in Table 2.

TABLE 2

|  |  | Examples | | | | |
|---|---|---|---|---|---|---|
|  |  | 11 | 12 | 13 | 14 | 15 |
| Composition | Biodegradable resin | PLA | PLA | PLA | PLA | PLA/PBS |
|  | Wax/polyolefin Type | CW | PW | AW | LDPE | AW |
|  | Content (%) | 1.0 | 1.0 | 1.0 | 1.0 | 2.0 |
| Molding conditions | Sheet temperature immediately before molding (° C.) | 115 | 115 | 115 | 115 | 110 |
|  | Die temperature (° C.) | 110 | 110 | 110 | 110 | 100 |
|  | Die retention time (sec) | 20 | 20 | 20 | 20 | 20 |
| Moldability |  | E | E | E | E | G |
| Properties of molded container | Foaming ratio | 6.2 | 6.4 | 6.2 | 6.0 | 5.6 |
|  | Thickness (mm) | 1.7 | 1.6 | 1.5 | 1.6 | 1.7 |
|  | Degree of crystallinity (%) | 55 | 56 | 55 | 57 | 15 |
|  | Heat resistance-2 | E | E | E | E | G |
|  | Water vapor permeability (g · mm/m$^2$/day) | 26 | 22 | 20 | 16 | 28 |
|  | Oxygen permeability (ml/m$^2$/day/MPa) | 273 | 267 | 160 | 265 | 276 |

PLA: polylactic acid; PBS: polybutylene succinate;
CW: Candelilla wax; PW: Paraffin wax 155;
AW: Alcohol-type wax OX1949; LDPE: Low density polyethylene In each of Examples 7 to 9, the wax content was the same as that in Example 2, and in Examples 7 to 9, candelilla wax in Example 2 was replaced with paraffin wax, an alcohol-type wax and low density polyethylene, respectively. The foam articles of Examples 7 to 9 were extremely excellent in all of the moisture prevention property, heat resistance and resistance to oxygen permeation.

Example 10 used as a biodegradable resin a mixture of PLA and PBS, and the heat resistance of the biodegradable resin foam article of Example 10 was decreased as a reflection of the lower melting point of PBS, but was satisfactory.

On the contrary, the results for Comparative Examples were as follows. In Comparative Example 1, no wax was contained and the degree of crystallinity was less than 10%, and all of the heat resistance, moisture prevention property and resistance to oxygen permeation did not attain any satisfactory levels. In Comparative Example 2, an appropriate amount of wax was contained, but the heat treatment effect was low, and hence the degree of crystallinity was as low as less than 10%, and all of the heat resistance, moisture prevention property and resistance to oxygen permeation did not attain any satisfactory levels. In Comparative Example 3, a heat treatment was applied to attain a degree of crystallinity of 55%, and hence the heat resistance was excellent, but no wax was contained, and hence the moisture prevention property did not attain any satisfactory level, and the resistance to oxygen permeation was also poor. In Comparative Example 4, a large amount of wax was added, hence a large amount of eye mucus-like matter occurred on the discharge face of the die when the foam article was produced, and additionally the pressure variation of the die was also caused to prevent obtaining a satisfactory foam sheet.

Examples 11 to 15

The foam sheets obtained at the time of production of the foam articles of Example 2 and 7 to 10 were used, and fed to the vacuum pneumatic molding machine (manufactured by Asano Laboratories Co., Ltd.) to mold bowl-shaped food As is clear from Table 2, the molded containers thus obtained were the containers formed of closed cells and each having a foaming ratio of 5.6 to 6.4 and a thickness of 1.5 to 1.7 mm. Examples 11 to 14 were excellent in heat resistance, moisture prevention property and resistance to oxygen permeation. In Example 15 in which a mixture of PLA and PBS was used as a biodegradable resin, the heat resistance of the molded container was slightly decreased as a reflection of the lower melting point of PBS as compared to Examples 11 to 14, but was at a satisfactory level; the moisture resistance and the resistance to oxygen permeation were also excellent.

The invention claimed is:

1. A biodegradable resin foam article formed of a foam sheet made from a biodegradable resin composition which comprises 70% by mass or more of polylactic acid and 5 to 10% by mass of natural candelilla wax, wherein a water vapor permeability of the biodegradable resin foam article at 40° C. at 100% RH is 50 g-mm/m$^2$/day or less and an oxygen permeability at 20° C. at 90% RH of 1000 ml/m$^2$/day/MPa or less.

2. A biodegradable resin foam article according to claim 1, wherein a degree of crystallinity of the biodegradable resin composition forming the foam article is 10% or more.

3. A biodegradable resin molded container molded with a foam sheet made from a biodegradable resin composition which comprises 70% by mass or more of polylactic acid and 5 to 10% by mass of natural candelilla wax, wherein a water vapor permeability of the biodegradable resin molded container at 40° C. at 100% RH is 50 g-mm/m$^2$/day or less and an oxygen permeability at 20° C. at 90% RH of 1000 ml/m$^2$/day/MPa or less.

4. A biodegradable resin molded container according to claim 3, wherein a degree of crystallinity of the biodegradable resin composition forming the foam article is 10% or more.

* * * * *